(12) United States Patent
Guisado

(10) Patent No.: US 10,877,959 B2
(45) Date of Patent: Dec. 29, 2020

(54) INTEGRATED DATABASE TABLE ACCESS

(71) Applicant: SAP SE, Walldorf (DE)

(72) Inventor: Victor Silva Guisado, Heidelberg (DE)

(73) Assignee: SAP SE, Walldorf (DE)

( * ) Notice: Subject to any disclaimer, the term of this patent is extended or adjusted under 35 U.S.C. 154(b) by 243 days.

(21) Appl. No.: 15/873,361

(22) Filed: Jan. 17, 2018

(65) Prior Publication Data

US 2019/0220533 A1 Jul. 18, 2019

(51) Int. Cl.
| | |
|---|---|
| G06F 16/2455 | (2019.01) |
| G06F 16/23 | (2019.01) |
| G06F 16/11 | (2019.01) |
| G06F 16/22 | (2019.01) |
| G06F 16/242 | (2019.01) |

(52) U.S. Cl.
CPC ........ G06F 16/2372 (2019.01); G06F 16/113 (2019.01); G06F 16/2282 (2019.01); G06F 16/2445 (2019.01); G06F 16/24564 (2019.01)

(58) Field of Classification Search
CPC ............. G06F 16/2372; G06F 16/2282; G06F 16/2445; G06F 16/113; G06F 16/24564
See application file for complete search history.

(56) References Cited

U.S. PATENT DOCUMENTS

| | | | | |
|---|---|---|---|---|
| 5,857,188 A * | 1/1999 | Douglas | ................ | G06F 16/252 |
| 2004/0133561 A1* | 7/2004 | Burke | .................. | G06Q 10/107 |
| 2009/0299973 A1* | 12/2009 | Kataoka | ................ | G06F 16/172 |
| 2010/0281079 A1* | 11/2010 | Marwah | .................. | H03M 7/30 |
| | | | | 707/812 |
| 2013/0191650 A1* | 7/2013 | Balakrishnan | .......... | H04L 9/008 |
| | | | | 713/190 |
| 2014/0074805 A1* | 3/2014 | Kapoor | ................. | G06F 16/902 |
| | | | | 707/693 |
| 2015/0205678 A1* | 7/2015 | Kottomtharayil | ... | G06F 11/1464 |
| | | | | 707/692 |
| 2016/0224550 A1* | 8/2016 | Morris | ................ | G06F 16/1873 |
| 2016/0275135 A1* | 9/2016 | O'Reilly | ............... | G06F 16/254 |
| 2016/0335323 A1* | 11/2016 | Teodorescu | ........... | G06F 3/0656 |
| 2017/0098010 A1* | 4/2017 | Kohinata | .......... | G06F 16/90335 |
| 2017/0193026 A1* | 7/2017 | Pettovello | ................ | H04L 9/14 |

(Continued)

OTHER PUBLICATIONS

Simon Liew, SQL Sever 2016 Compress and Decompress Functions, 2016, all pages. (Year: 2016).*

(Continued)

*Primary Examiner* — Irete F Ehichioya
*Assistant Examiner* — Antonio J Caiado
(74) *Attorney, Agent, or Firm* — Mintz Levin Cohn Ferris Glovsky and Popeo, P.C.

(57) ABSTRACT

A method may include intercepting a database query from a client to a database. The database query may include a first identifier associated with a first database table. A second database table stored at the database may be determined to correspond to the first database table. The database query may be reconstructed by at least replacing the first identifier with a second identifier associated with the second database table. The reconstructed database query may be executed by at least sending, to the database, the reconstructed database query. Related systems and articles of manufacture, including computer program products, are also provided.

16 Claims, 5 Drawing Sheets

(56) References Cited

U.S. PATENT DOCUMENTS

2017/0318027 A1* 11/2017 Rodniansky ........ H04L 63/1425
2017/0364446 A1* 12/2017 Pham .................. G06F 12/1009
2017/0364701 A1* 12/2017 Struttmann ............. G06F 21/78
2019/0146946 A1*  5/2019 Zhang ................. G06F 16/1744
                                                         707/667
2019/0347194 A1* 11/2019 Lu ....................... G06F 12/0692

OTHER PUBLICATIONS

Microsoft, Data Compression, Aug. 12, 2017, Publish by Microsoft Docs, all pages. (Year: 2017).*

SQLite, SQLite Archive Files, Apr. 6, 2018, Publish by SQlite, all pages. (Year: 2018).*

* cited by examiner

INTEGRATED DATABASE TABLE ACCESS

TECHNICAL FIELD

The subject matter described herein relates generally to database processing and more specifically to cross system integration.

BACKGROUND

A database may be configured to store an organized collection of data. The database may be coupled with a database management system (DBMS) that supports a variety of operations for accessing, managing, and/or updating the data held in the database. For example, at least some of the data in the database may be retrieved, updated, and/or deleted by executing one or more database queries such as, for example, structured query language (SQL) statements.

SUMMARY

Systems, methods, and articles of manufacture, including computer program products, are provided for executing database queries. In one aspect, there is provided a system. The system may include at least one data processor and at least one memory. The at least one memory may store instructions that result in operations when executed by the at least one data processor. The operations may include: intercepting a database query from a client to a database, the database query including a first identifier associated with a first database table; determining that a second database table stored at the database corresponds to the first database table; reconstructing the database query by at least replacing the first identifier with a second identifier associated with the second database table; and executing the reconstructed database query by at least sending, to the database, the reconstructed database query.

In some variations, one or more features disclosed herein including the following features can optionally be included in any feasible combination. The second database table may correspond to the first database table by at least including a same data as the first database table. The reconstructed database query may be executed instead of the database query. The execution of the reconstructed database query may include retrieving, based at least on the second identifier, data from the second database table. At least a portion of the data retrieved from the second database table may be sent to the client.

In some variations, the first database table may compressed to form an archive file associated with a third identifier. The second database table may be formed by at least decompressing the archive file. In response to the compression of the first database table and/or the decompression of the archive file, a mapping table may be updated to include at least a mapping between the first identifier and the second identifier. The correspondence between the first database table and the second database table may be determined based at least on the mapping between the first identifier and the second identifier included in the mapping table. The archive file may be stored at an offline data store instead of the database. The first database table may be removed from the database. The decompression of the archive file may restore, as the second database table, at least a portion of data included in the first database table.

In some variations, the database query and/or the reconstructed database query may be a structured query language statement. The reconstructed database query may be sent to the database by at least sending the reconstructed database query to a database management system coupled with the database.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or statements or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

An enterprise may store data across multiple data storage systems. For example, some data including, for example, recent and/or frequently used data, may be held in an online database for immediate access. Meanwhile, other data including, for example, older and/or infrequently used data, may be held in an offline data store. The offline data store may be an information lifecycle management system configured to maintain and discard data in accordance with data retention policies applicable to the enterprise. However, inefficiencies may arise when accessing data held in the offline data store. For example, a user may need to prepare a report requiring data from the offline data store but may have limited access to this data compared to the data held in the online database. As such, in some example embodiments, an adaptive controller may be configured to integrate data held in the offline data store such that the user may be able to access this data in a same manner as data held in the online database.

Figure 1:
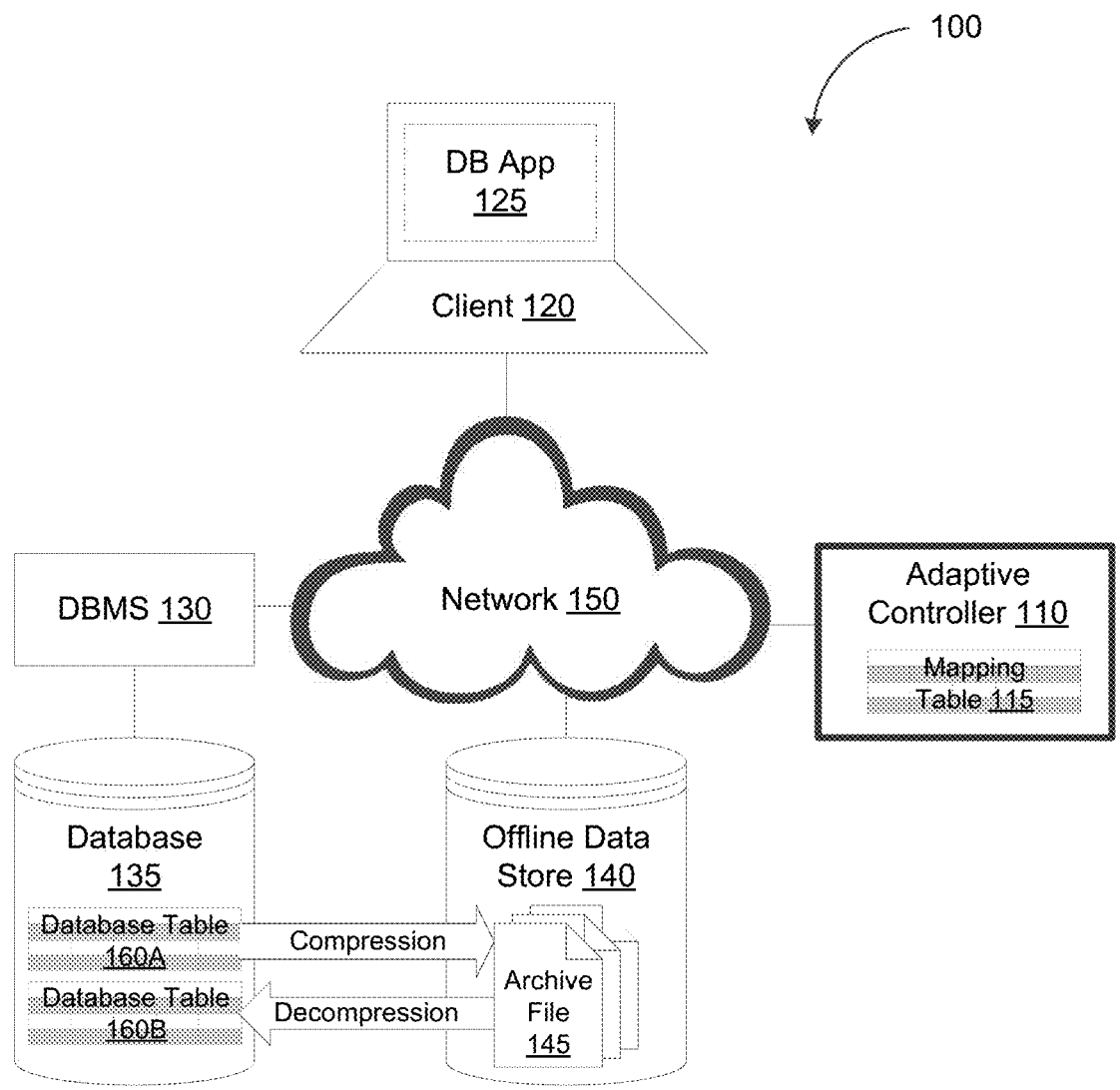
FIG. 1 depicts a system diagram illustrating an integrated data storage system, in accordance with some example embodiments.

FIG. 1 depicts a system diagram illustrating an integrated data storage system 100, in accordance with some example embodiments. Referring to FIG. 1, the integrated data storage system 100 may include an adaptive controller 110. The adaptive controller 110 may be communicatively coupled with a client 120, a database management system 130, and an offline data store 140. The adaptive controller 110 may be communicatively coupled with the client 120, the database management system 130, and/or the offline data store 140 via a network 150. It should be appreciated that the network 150 may be any wired and/or wireless network including, for example, a wide area network (WAN), a local area network (LAN), a virtual local area network (VLAN), a public land mobile network (PLMN), the Internet, and/or the like.

As shown in FIG. 1, the database management system 130 may be coupled with a database 135, which may be any type of database including, for example, an in-memory database, a relational database, a non-SQL (NoSQL) database, and/or the like. The database management system 135 may support a variety of operations for accessing the data held in the database 135. For instance, the client 120 may interact with the database management system 130 via a database application 125 at the client 120. The client 120 may access data held in the database 135 by at least sending, via the database application 125, one or more database queries (e.g., SQL statements) to the database management system 130.

In some example embodiments, the database 135 may be an online database. As used herein, an online database may be a database configured to provide immediate access to data. For example, to support immediate access, the database 135 may organize data into one or more database tables including, for example, a first database table 160A and/or a second database table 160B. Organizing data into database tables may enable high speed search and/or retrieval of data. By contrast, the offline data store 140 may be optimized for long term storage of infrequently used data. Accordingly, the offline data store 140 may be configured to maximize storage capacity, for example, through various compression techniques including, for example, Lempel-Ziv encoding, Huffman encoding, arithmetic encoding, differential encoding, prefix and postfix compression, semantic compression, and/or the like. Here, the first database table 160A may be a standard database table stored at the database 135. Compressing a standard database table such as, for example, the first database table 160A, may remove the formatting and/or structure associated with the standard database table. Furthermore, compressing the first database table 160A may change the original identifier associated with the first database table 160A.

As used herein, a database (e.g., the database 135 and/or the like) may refer to an organized collection of data objects including, for example, schemas, tables, queries, reports, views, and/or the like. Meanwhile, a database table (e.g., the first database table 160A, the second database table 160B, and/or the like) may refer to a set of data elements (e.g., values), which may have been organized into vertical columns and/or horizontal rows.

Referring again to FIG. 1, the offline data store 140 may store a plurality of archive files including, for example, an archive file 145. These archive files (e.g., the archive file 145) may be generated by applying one or more compression techniques to database tables including, for example, the first database table 160A. Accessing the data included in the first database table 160A may require unpacking at least the archive file 145. The unpacking of the archive file 145 may include, for example, decompressing the archive file 145 to restore the data included in the first database table 160A. For example, decompressing the archive file 145 may form at least the second database table 160B, which may include the same data as the first database table 160A. As noted, the first database table 160A may be a standard database table. By contrast, the second database table 160B may be a temporary database table that is formed by restoring the data included in the first database table 160A, for example, by decompressing the archive file 145.

The second database table 160B may be held in the database 135 for immediate access by the client 120. It should be appreciated that the compression of the first database table 160A to form the archive file 145 and/or the decompression of the archive file 145 to form the second database table 160B may change the identifier (e.g., name) of the first database table 160A such that the second database table 160B may have a different identifier than the first database table 160A, even though both database tables may include the same data. In some example embodiments, the adaptive controller 110 may track this change in identifier. For example, the adaptive controller 110 may maintain a mapping table 115. The mapping table 115 may store a mapping between a current identifier of the second database table 160B and the original identifier of the first database table 160A.

Figure 2:
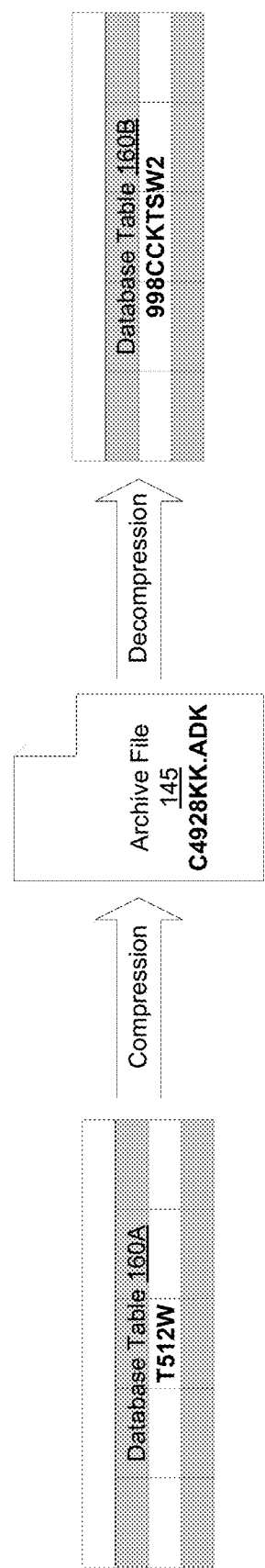
FIG. 2 depicts a flow of data between an online database and an offline data store, in accordance with some example embodiments.

To further illustrate, FIG. 2 depicts a flow of data between the online database 135 and the offline data store 140, in accordance with some example embodiments. Referring to FIG. 2, the first database table 160A may initially be associated with an identifier "T512W." The first database table 160A may be subject to one or more compression techniques including, for example, deduplication, Lempel-Ziv encoding, Huffman encoding, arithmetic encoding, differential encoding, prefix and postfix compression, semantic compression, and/or the like. Subjecting the first database table 160A to one or more compression techniques may generate the archive file 145, which may be associated with a different identifier "C4928KK.ADK" and stored at the offline data store 140. Accessing the first database table 160A may require restoring the first database table 160A, which may include unpacking the archive file 145 at the database 135. For example, the archive file 145 may be unpacked by at least decompressing the archive file 145. Unpacking the archive file 145, for example, through decompression, may generate the second database table 160B, which may be associated with the identifier "998CCKTSW2."

It should be appreciated that the second database table 160B and the first database table 160A may include identical data. However, the second database table 160B may be associated with a different identifier than the first database table 160A. That is, the second database table 160B stored at the database 135 may be associated with the identifier "998CCKTSW2" and not the identifier "T512W" originally associated with the first database table 160A. This change in identifier may prevent the client 120 from accessing the second database table 160B by referencing the identifier (e.g., "T512W") originally associated with the first database table 160A. As such, in some example embodiments, the adaptive controller 110 may maintain the mapping table 115, which may include a mapping between the identifier "T512W" and the identifier "998CCKTSW2." In doing so, the adaptive controller 110 may be able to determine when the client 120 is accessing the second database table 160B, even though the database query from the client 120 may reference the identifier "T512W" associated with the first database table 160A.

For example, the client 120 may access the first database table 160A when the client 120 generates a report (e.g., a Payroll Reconciliation Report) that requires data from the first database table 160A. In order to generate the report, the client 120 may send, via the database application 125, a database query to the database management system 130. The database query may include, for example, a SQL SELECT statement referencing the identifier "T512W" originally associated with the first database table 160A. However, as noted, compressing the first database table 160A into the archive file 145 and subsequently decompressing the archive file 145 into the second database table 160B may change the original identifier "T512W" associated with the first database table 160A. That is, although the first database table 160A and the second database table 160B may include identical data, the second database table 160B may be associated with the different identifier "998CCKTSW2." Accordingly, the database management system 130 may be unable to resolve the identifier "T512W" included in the database query from the client 120 because the first database table 160A with the identifier "T512W" may have been compressed and moved to the offline data store 140 and therefore no longer exists at the database 135. Instead, the database 135 may include the second database table 160B, which may include identical data as the first database table 160A, but may be associated with the different identifier "998CCKTSW2."

According to some example embodiments, the adaptive controller 110 may be configured to intercept the database query from the client 120. Furthermore, the adaptive controller 110 may determine, based at least on the mapping table 115, that the identifier "T512W" included in the database query may refer to the second database table 160B. The adaptive controller 110 may further reconstruct the database query by at least replacing the identifier "T512W" with the identifier "998CCKTSW2" associated with the second database table 160B. The reconstructed database query may be sent to the database management system 130 instead of the original database query from the client 120. It should be appreciated that the database management system 130 may be able to resolve the identifier "998CCKTSW2" included in the reconstructed database query whereas the database management system 130 may be unable to resolve the identifier "T512W" included in the original database query from the client 120. For instance, the database management system 130 may respond to the reconstructed database query from the adaptive controller 110 by at least accessing, based on the identifier "998CCKTSW2," the second database table 160B and retrieving the data required by the reconstructed database query. Data from the second database table 160B may be returned to the client 120 where the client 120 may be able to generate a report (e.g., a Payroll Reconciliation Report) based on the data.

Figure 3:
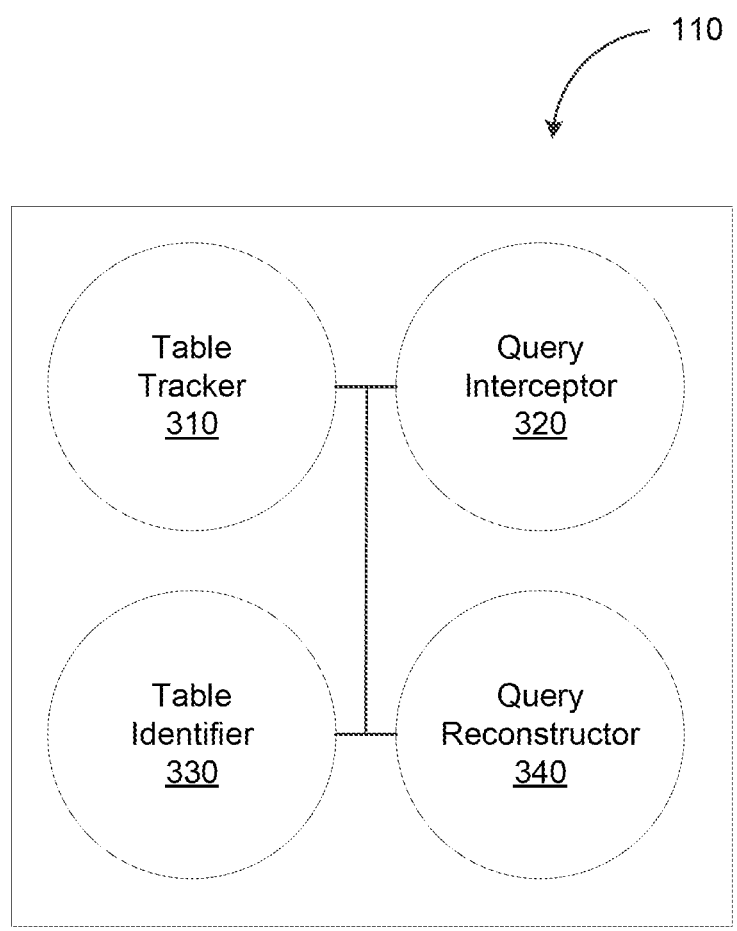
FIG. 3 depicts a block diagram illustrating an adaptive controller, in accordance with some example embodiments.

FIG. 3 depicts a block diagram illustrating the adaptive controller 110, in accordance with some example embodiments. Referring to FIGS. 1 and 3, the adaptive controller 110 may include a table tracker 310, a query interceptor 320, a table identifier 330, and a query reconstructor 340. It should be appreciated that the adaptive controller 110 may include different and/or additional components than shown in FIG. 3.

In some example embodiments, the table tracker 310 may be configured to generate, maintain, and/or update the mapping table 150 by at least tracking the compression and/or decompression of database tables. For example, the table tracker 310 may detect when the first database table 160A is compressed to generate the archive file 145. Alternatively and/or additionally, the table tracker 310 may detect when the archive file 145 is decompressed to generate the second database table 160B. In response to detecting the compression of the first database table 160A to generate the archive file 145 and/or the decompression of the archive file 145 to generate the second database table 160B, the table tracker 310 may update the mapping table 150 to at least reflect the changes in the corresponding identifiers. As noted, the archive file 145 may be associated with a different identifier than the first database table 160A even though the archive file 145 may be formed by decompressing the first database table 160A. Moreover, the second database table 160B may also be associated with a different identifier than the first database table 160A even though the second database table 160B may be generated by decompressing the archive file 145 and may include a same data as the first database table 165A.

For instance, in response to detecting the compression of the first database table 160A to form the archive file 145, the table tracker 310 may update the mapping table 150 to indicate an association between the identifier "T512W" originally associated with with the first database table 160A and the identifier "C4928KK.ADK" associated with the archive file 145. Alternatively and/or additionally, in response to detecting the decompression of the archive file 145 to form the second database table 160B, the table tracker 310 may further update the mapping table 150 to indicate an association between the identifier "C4928KK.ADK" associated with the archive file 145 and the identifier "998CCK-TSW2" associated with the second database table 160B. It should be appreciated that these updates to the mapping table 150 may indicate a mapping between the identifier "T512W" associated with the first database table 160A and the identifier "998CCKTSW2" associated with the second database table 160B.

In some example embodiments, the query interceptor 320 may be configured to intercept one or more database queries, for example, from the client 120 to the database management system 130. For example, the client 120 may access one or more database tables at the database 135 by at least sending, to the database management system 130, a database query. The database query may include, for example, a SQL SELECT statement that includes the identifiers of the one or more database tables. According to some example embodiments, the query interceptor 320 may intercept the database query in response to detecting one or more triggers including, for example, the execution of a database query by the database management system 130.

In some example embodiments, the table identifier 330 may be configured to identify the database tables accessed by the database query intercepted by the query interceptor

320. For example, the database query may include a SQL SELECT statement referencing the identifier "T512W" originally associated with the first database table 160A. As noted, the first database table 160A may have undergone compression and/or decompression, which may have changed the identifier "T512W." For example, compressing the first database table 160A to form the archive file 145 may have changed the identifier from "T512W" to "C4928KK.ADK." Meanwhile, decompressing the archive file 145 to form the second database table 160B may have further changed the identifier from "C4928KK.ADK" to "998CCKTSW2." The table identifier 130 may determine, based at least on the mapping table 150, that the identifier "T512W" included in the database query may be mapped to the identifier "998CCKTSW2" associated with the second database table 160B.

The query reconstructor 340 may be configured to reconstruct the database query intercepted by the query interceptor 320. The reconstructed database query may be sent to the database management system 130 instead of the original database query from the client 120. In some example embodiments, the query reconstructor 340 may reconstruct the database query by at least replacing the identifier "T512W" included in the original database query with the identifier "998CCKTSW2," as determined by the table identifier 330. As noted, the identifier "T512W" may be associated with the first database table 160A, which may include identical data as the second database table 160B associated with the identifier "998CCKTSW2." However, the database management system 130 may be able to resolve the identifier "998CCKTSW2" but not the identifier "T512W." Accordingly, replacing the identifier "T512W" included in the original database query from the client 120 with the identifier "998CCKTSW2" may enable the database management system 130 to execute the database query. For example, the reconstructed database query may be sent to the database management system 130 where the reconstructed database query may be executed by at least retrieving, from the second database table 160B and based on the identifier "998CCKTSW2," the data required by the client 120.

Figure 4:
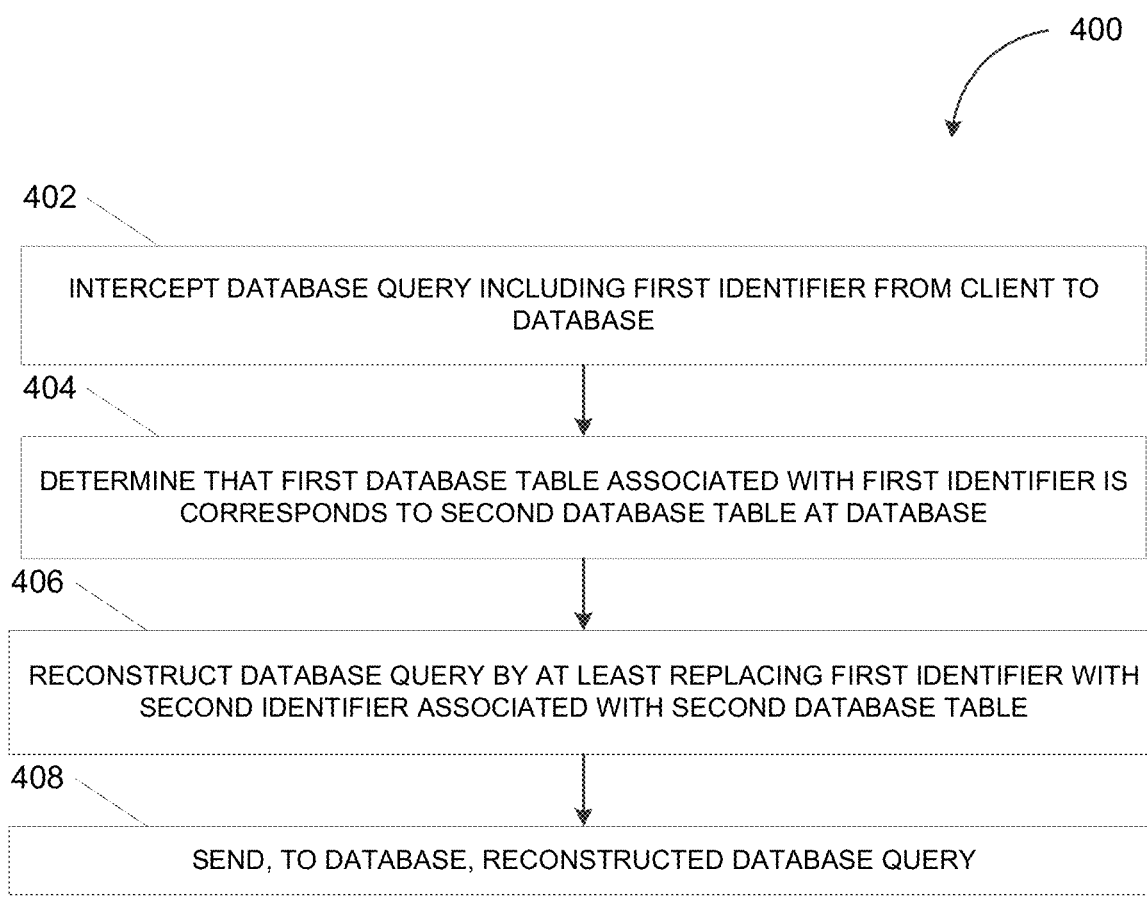
FIG. 4 depicts a flowchart illustrating a process for executing a database query, in accordance with some example embodiments.

FIG. 4 depicts a flowchart illustrating a process 400 for executing a database query, in accordance with some example embodiments. Referring to FIGS. 1-4, the process 400 may be performed by the adaptive controller 110.

At 402, the adaptive controller 110 may intercept a database query including a first identifier from the client 120 to the database 135. For example, the client 120 may generate a report (e.g., a Payroll Reconciliation Report) that requires data from the first database table 160A. As such, the client 120 may send, to the database management system 130, a database query. The database query may include a SQL SELECT statement that includes the identifier "T512W," which may be associated with the first database table 160A prior to the compression and/or decompression of the first database table 160A. In some example embodiments, the adaptive controller 110 may intercept the database query from the client 120 to the database management system 130.

At 404, the adaptive controller 110 may determine that the first database table 160A associated with the first identifier corresponds to the second database table 160B at the database 135. For example, compressing the first database table 160A to form the archive file 145 may change the identifier associated with the first database table 160A from "T512W" to "C4928KK.ADK." Meanwhile, decompressing the archive file 145 to generate the second database table 160B may further change the identifier associated with the archive file 145 from "C4928KK.ADK" to "998CCKTSW2." In some example embodiments, the adaptive controller 110 may track this change in identifier from "T512W" to "C4928KK.ADK" and/or from "C4928KK.ADK" to "998CCKTSW2." For example, the adaptive controller 110 may generate, maintain, and/or update the mapping table 150 to reflect this change in identifiers. By tracking this change in identifiers, the adaptive controller 110 may determine, base at least on the mapping table 150, that the identifier "T512W" included in the database query from the client 120 may refer to the second database table 160B.

At 406, the adaptive controller 110 may reconstruct the database query by at least replacing the first identifier with a second identifier associated with the second database table. For example, in some example embodiments, the adaptive controller 110 may reconstruct the database query by at least replacing the identifier "T512W" with the identifier "998CCKTSW2." As noted, the identifier "T512W" may reference the original first database table 160A while the identifier "998CCKTSW2" may reference the second database table 160B. The database management system 130 may be unable to resolve the identifier "T512W" included in the database query from the client 120 because the first database table 160A with the identifier "T512W" has been compressed and moved to the offline data store 140 and therefore does not exist at the database 135. Instead, the database 135 may include the second database table 160B, which may include identical data as the first database table 160A, but may be associated with the different identifier "998CCKTSW2."

At 408, the adaptive controller 110 may send, to the database 135, the reconstructed database query. For example, the reconstructed database query may include the identifier "998CCKTSW2," which may reference the second database table 160B. The database management system 130 may execute the reconstructed database query by at least retrieving, based at least on the identifier "998CCKTSW2," at least a portion of the data from the second database table 160B. The data retrieved from the second database table 160B may be returned to the client 120 where the data may be used to generate a report (e.g., a Payroll Reconciliation Report).

Figure 5:
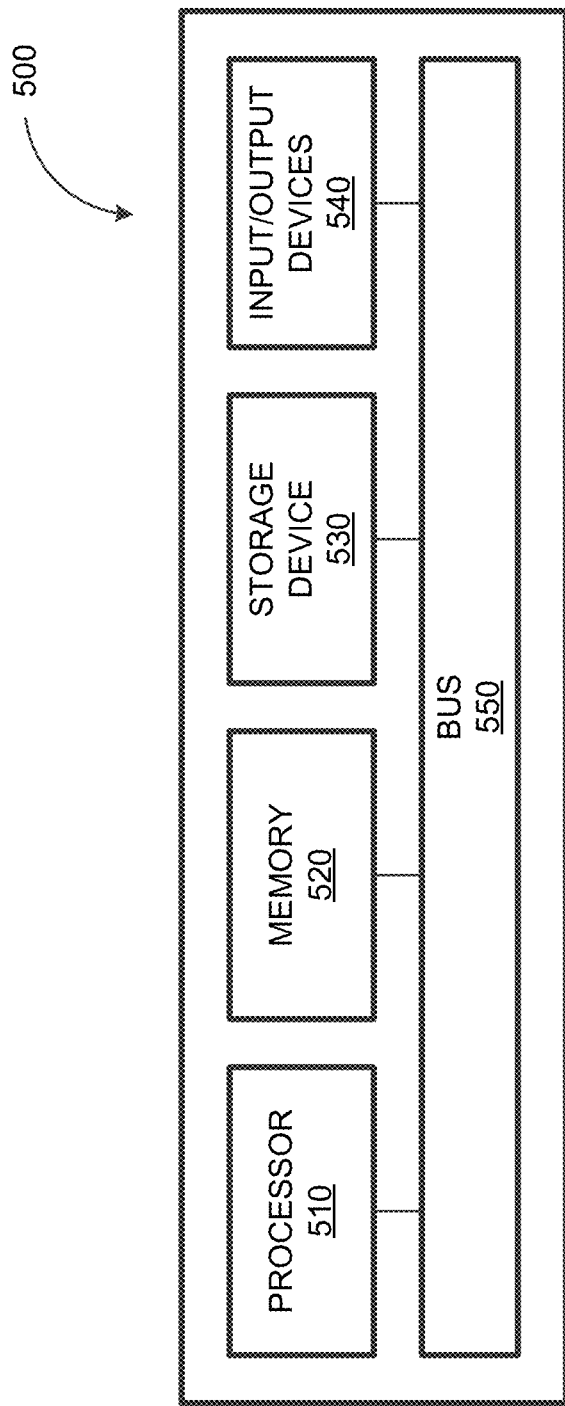
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the adaptive controller 110, the client 120, the database management system 130, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the adaptive controller 110, the client 120, and/or the database management system 130. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   compressing a first database table in a database to form an archive file, the first database table being associated with a first identifier;
   restoring at least a portion of a data included in the first database table by at least decompressing the archive file to generate, at the database, a second database table associated with a second identifier and having at least the portion of the data included in the first database table;
   updating a mapping table to include a first mapping between the first identifier of the first database table and the second identifier of the second database table;
   intercepting a database query from a client to the database, the database query including the first identifier of the first database table;
   determining, based at least on the first mapping included in the mapping table, that the second database table corresponds to the first database table;
   in response to determining that the second database table corresponds to the first database table, reconstructing the database query by at least replacing the first identifier of associated with the first database table with the second identifier associated with the second database table; and
   executing the reconstructed database query by at least sending, to the database, the reconstructed database query.

2. The system of claim 1, wherein the second database table corresponds to the first database table by at least including a same data as the first database table.

3. The system of claim 1, wherein the reconstructed database query is executed instead of the database query, and wherein the execution of the reconstructed database query includes retrieving, based at least on the second identifier, data from the second database table.

4. The system of claim 3, further comprising:
   sending, to the client, at least a portion of the data retrieved from the second database table.

5. The system of claim 1, further comprising:
   in response to the compressing of the first database table, updating the mapping table to include a second mapping between the first identifier of the first database table and a third identifier of the archive file.

6. The system of claim 1, wherein the archive file is stored at an offline data store instead of the database, and wherein the first database table is removed from the database upon being compressed to form the archive file.

7. The system of claim 1, wherein the database query and/or the reconstructed database query comprise a structured query language statement.

8. The system of claim 1, wherein the reconstructed database query is sent to the database by at least sending the reconstructed database query to a database management system coupled with the database.

9. A computer-implemented method, comprising:
   compressing a first database table in a database to form an archive file, the first database table being associated with a first identifier;
   restoring at least a portion of a data included in the first database table by at least decompressing the archive file to generate, at the database, a second database table associated with a second identifier and having at least the portion of the data included in the first database table;
   updating a mapping table to include a first mapping between the first identifier of the first database table and the second identifier of the second database table;
   intercepting a database query from a client to the database, the database query including the first identifier of the first database table;
   determining, based at least on the first mapping included in the mapping table, that the second database table corresponds to the first database table;
   in response to determining that the second database table corresponds to the first database table, reconstructing the database query by at least replacing the first identifier of associated with the first database table with the second identifier associated with the second database table; and
   executing the reconstructed database query by at least sending, to the database, the reconstructed database query.

10. The method of claim 9, wherein the second database table corresponds to the first database table by at least including a same data as the first database table.

11. The method of claim 9, wherein the reconstructed database query is executed instead of the database query, and wherein the execution of the reconstructed database query includes retrieving, based at least on the second identifier, data from the second database table.

12. The method of claim 11, further comprising:
    sending, to the client, at least a portion of the data retrieved from the second database table.

13. The method of claim 9, further comprising:
    in response to the compressing of the first database table, updating the mapping table to include a second mapping between the first identifier of the first database table and a third identifier of the archive file.

14. The method of claim 9, wherein the archive file is stored at an offline data store instead of the database, and wherein the first database table is removed from the database upon being compressed to form the archive file.

15. The method of claim 9, wherein the database query and/or the reconstructed database query comprise a structured query language statement.

16. A non-transitory computer program product storing instructions, which when executed by at least one data processor, result in operations comprising:
    compressing a first database table in a database to form an archive file, the first database table being associated with a first identifier;
    restoring at least a portion of a data included in the first database table by at least decompressing the archive file to generate, at the database, a second database table associated with a second identifier and having at least the portion of the data included in the first database table;
    updating a mapping table to include a first mapping between the first identifier of the first database table and the second identifier of the second database table;

intercepting a database query from a client to the database, the database query including the first identifier of the first database table;

determining, based at least on the first mapping included in the mapping table, that the second database table corresponds to the first database table;

in response to determining that the second database table corresponds to the first database table, reconstructing the database query by at least replacing the first identifier of associated with the first database table with the second identifier associated with the second database table; and executing the reconstructed database query by at least sending, to the database, the reconstructed database query.

\* \* \* \* \*